(No Model.)
J. ELLIS.
VEHICLE.
No. 417,713. Patented Dec. 24, 1889.
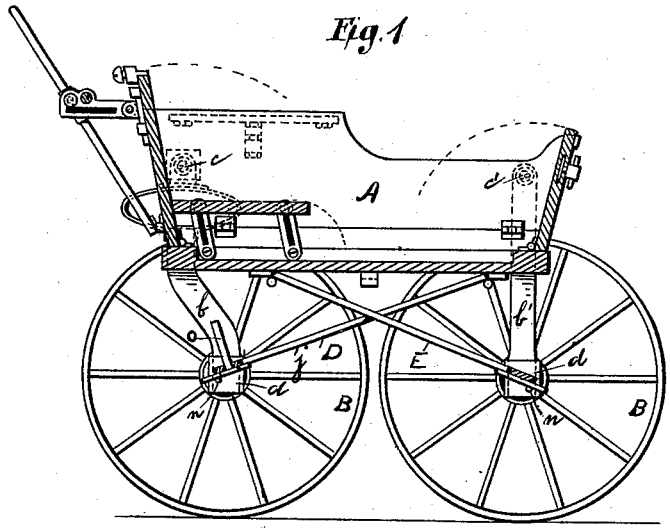
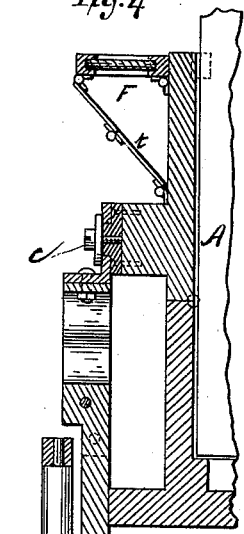
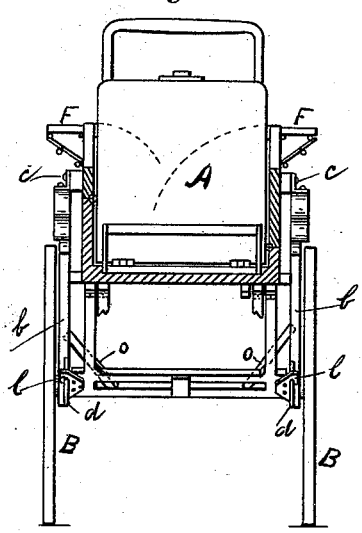
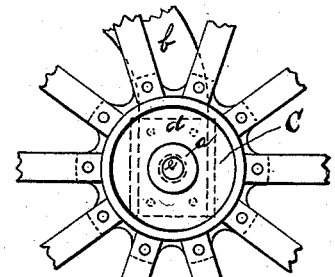
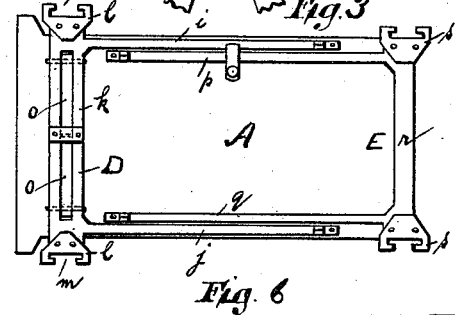
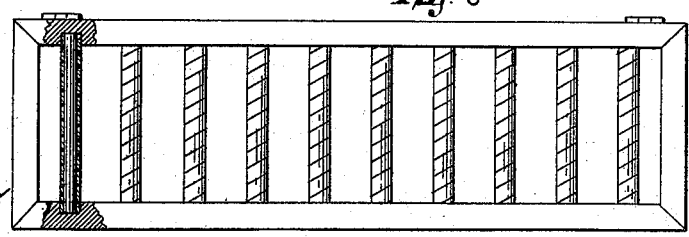
Witnesses
Geo. Wadman
Crompton Gifford
Inventor
John Ellis
by Gifford & Brown
Attys.
N. PETERS, Photo-Lithographer, Washington, D. C.

UNITED STATES PATENT OFFICE.

JOHN ELLIS, OF JERSEY CITY, ASSIGNOR OF ONE-HALF TO WILLIAM T. WALLIS, OF EAST ORANGE, NEW JERSEY.

VEHICLE.

SPECIFICATION forming part of Letters Patent No. 417,713, dated December 24, 1889.

Application filed September 11, 1889. Serial No. 323,600. (No model.)

*To all whom it may concern:*

Be it known that I, JOHN ELLIS, of Jersey City, New Jersey, have invented a new and useful Improvement in Vehicles, of which the following is a specification.

My invention relates to improvements upon the structure shown in an application filed by me in the United States Patent Office on the 29th day of September, 1888, Serial No. 286,720, though certain of the devices which I am about to describe may be usefully employed in other connections than in the particular vehicle therein described. The full description of many of the parts in said application will, however, make it unnecessary for me to repeat the same herein.

The first part of my invention pertains to the wheels and the connection between the same and the arms connected with the body of the vehicle.

The second part of my invention relates to the means by which the arms to which the wheels are journaled are held in position relatively to the body of the vehicle.

Other parts of my invention relate to other features of construction hereinafter pointed out.

Figure 1 of the accompanying drawings is a longitudinal section of a folding baby-carriage containing my invention. Fig. 2 is a cross-section of the same. Fig. 3 is an inverted plan view with the wheels and the arms to which they are journaled removed, the braces for the wheel-arms being folded up. Fig. 4 is a vertical section taken through the axis of one of the wheels and the arm connecting the same with the side of the body. Fig. 5 is a face view of the central portion of a wheel. Fig. 6 is a detail showing one of the arm-rests.

A is the body of the wagon, constructed to be folded as described in said former application, no further description being required herein.

B are the wheels.

C is the plate, to the periphery of which the spokes of the wheels are connected at their inner ends. At the center of this plate is a sleeve $a$, which serves as the hub of the wheel. At its outer end this sleeve or hub terminates flush with the exterior plane of the wheel, so as not to protrude beyond the same, and the proper extent of bearing-surface is provided by the protrusion, as shown in Fig. 4, of this sleeve or hub inward beyond the inner plane of the wheel.

$b$ are the arms upon which the hind and front wheels are respectively journaled. They are pivoted, so as to swing longitudinally, to the hinged side sections of the body at $c$ and $c'$, respectively. At their lower extremity a hole $f$ is bored through each of them just large enough to receive the end of the hub $a$, protruding beyond the inner plane of the wheel.

$d$ is a rectangular plate—one for each wheel-arm—which is bolted to the inner side of the arm $b$, so as to cover the hole already referred to.

$e$ is a journal fixed to the plate $d$, projecting outwardly and located centrally in the hole $f$. This journal is of suitable size to fit the hub or sleeve $a$, and is of corresponding length with the hub, so that the hub may be secured thereon between the plate $g$ and the plate $d$ by means of a screw $h$.

By the arrangement just described it will be observed that while the bearing for the wheel is maintained of proper length, yet by secreting a portion of the hub within the supporting standard or arm $b$ the apparent length of the hub is reduced almost to the width of the wheel itself, so as to occupy a minimum amount of space. At the same time the wheel runs firmly between the plates $d$ and $g$, and the journal $e$ is held rigid by the firm connections between the plate $d$ and the arm $b$. Also, an element of stiffness may be secured, if desired, by causing the exterior of the hub to fit tightly within, so as to have a bearing against the sides of the hole $f$.

The following mechanism is employed for holding the wheel standards or arms $b$ in position for use: For the hind wheels is the frame D, and for the front wheels the frame E. The frame D consists of two longitudinal side pieces $i$ and $j$, hinged to the bottom of the wagon near the front thereof and extending, when the wagon is in use, backward and downward, as shown in Fig. 1, and connected at their rear ends by the cross-piece k. At each end of this cross-piece k is a plate l, having a T-shaped recess m cut at its outer edge. This recess is so constructed as to receive the rectangular plate d, the plate l sliding down in an inclined position upon the plate d until it reaches the stop n on the plate d, by which it is held vertically. When the plates l and d occupy the relative position shown in Figs. 1 and 2, the hind wheels will be braced longitudinally by the side pieces i and j and transversely by the cross-piece k. Additional security transversely may be afforded by the braces o, which, when the wagon is folded, may lie in slots provided in the cross-piece k, as shown in Fig. 3.

The frame E consists of the side pieces p and q, hinged at one end to the bottom of the body, near the rear end thereof, and extending, when the wagon is in use, in a forward and downward direction, and connected at their forward ends by the cross-piece r. This cross-piece is provided with plates s, corresponding with the plates l, already described, and which in use are combined with the plates d for the forward wheels in the same manner as the plates l are combined with the plates d for the rear wheels.

When the carriage is folded, the frames D and E are swung up against the bottom of the body in the position shown in Fig. 3.

F is an arm-rest supported from below by the jointed brace t. The construction of this arm-rest, on which no claim is made in this application, is shown in Fig. 6.

Having thus described the features of my present invention, I do not desire to limit myself to the details of construction; nor do I desire to limit myself to the application of those features to the particular structure described and shown.

I claim—

1. In a vehicle, in combination, a support for the wheel-journal, provided with an annular opening surrounding the journal to receive the hub, the journal, a piece connecting the journal with said support, and a wheel provided with a hub adapted to project within said annular opening, substantially as described.

2. In a vehicle, in combination, a wheel-support provided with an opening to receive the end of the hub, a plate arranged at the rear of said opening, a journal secured to said plate and projecting outward through said opening, and a wheel provided with a hub adapted to fit said journal within said opening and rest at its inner end against said plate, substantially as described.

3. In a vehicle, in combination, an arm extending downward from the body and having at its lower end an opening through which the journal projects, the journal, and a wheel provided with a hub projecting inwardly and adapted to fit said journal within said opening, substantially as described.

4. In a vehicle, in combination, a wheel having its spokes connected with a center plate, at the middle of which plate is arranged a sleeve or hub, which at its outer end is substantially flush with the outer plane of the wheel, but which at its inner end projects beyond the inner plane of the wheel, a journal for said hub, a wheel-standard provided with a hole to receive the projecting end of the hub, and the plate by which said journal is connected with said standard so as to project through said hole, substantially as described.

5. In a vehicle, in combination, the wheel-standards pivoted to the body so as to swing longitudinally, a frame for steadying the forward wheels, consisting of a cross-piece secured to the body by a brace extending upwardly toward the rear of the wagon, and a frame for steadying the rear wheels, consisting of a cross-piece secured to the body by a brace extending upwardly toward the front, substantially as described.

6. In combination, the interlocking plates d and s, the wheel-standards to which the plates d are secured, and the inclined bracing-frames to which the plates s are secured, substantially as described.

7. In a vehicle, in combination, the wheels, the standards pivoted to the body, so as to swing longitudinally and provided with the wheel-journals, and the braces extending, respectively, from the front and rear wheels to the body in an upwardly-inclined direction, the same being detachably connected with the wheels and hinged to the body, whereby they may be folded, substantially as described.

8. In a vehicle, in combination, a pair of wheels, a standard for each pivoted at one end to the vehicle-body and at the other bearing the wheel-journal, and a cross-piece extending between the standards, substantially as described.

9. In a vehicle, in combination, a pair of wheels, a standard for each pivoted at one end to the vehicle-body and at the other bearing the wheel-journal, a cross-piece extending between the standards, and the supplemental braces o o, substantially as described.

10. In a vehicle, in combination, a pair of wheels, a standard for each pivoted at one end to the vehicle-body and at the other bearing the wheel-journal, a cross-piece extending between the standards, and a brace extending upward in an inclined direction from the cross-piece to the body of the vehicle, substantially as described.

JOHN ELLIS.

Witnesses:
 J. E. GREER,
 WM. M. ILIFF.